US011635152B2

(12) United States Patent
Hayama et al.

(10) Patent No.: US 11,635,152 B2
(45) Date of Patent: Apr. 25, 2023

(54) CAPACITY CONTROL VALVE

(71) Applicant: Eagle Industry Co., Ltd., Tokyo (JP)

(72) Inventors: Masahiro Hayama, Tokyo (JP); Kohei Fukudome, Tokyo (JP); Toshinori Kanzaki, Tokyo (JP); Wataru Takahashi, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/293,435

(22) PCT Filed: Nov. 22, 2019

(86) PCT No.: PCT/JP2019/045731
§ 371 (c)(1),
(2) Date: May 12, 2021

(87) PCT Pub. No.: WO2020/110925
PCT Pub. Date: Jun. 4, 2020

(65) Prior Publication Data
US 2021/0404570 A1 Dec. 30, 2021

(30) Foreign Application Priority Data
Nov. 26, 2018 (JP) .............................. JP2018-220558

(51) Int. Cl.
*F16K 17/04* (2006.01)
*F04B 27/18* (2006.01)
(Continued)

(52) U.S. Cl.
CPC .............. *F16K 17/04* (2013.01); *F04B 27/18* (2013.01); *F16K 27/04* (2013.01); *F16K 31/0668* (2013.01)

(58) Field of Classification Search
CPC ...... F16K 17/04; F16K 27/04; F16K 31/0668; F04B 27/18; F04B 27/1804;
(Continued)

(56) References Cited

U.S. PATENT DOCUMENTS

| 1,614,002 A | 1/1927 | Horton ................. A62C 35/605 |
| 2,267,515 A | 12/1941 | Wilcox .............. F16K 31/0627 |

(Continued)

FOREIGN PATENT DOCUMENTS

| CN | 111279076 | 6/2020 | ............. F04B 27/18 |
| CN | 111316028 | 6/2020 | ............. F16K 31/06 |

(Continued)

OTHER PUBLICATIONS

The First Office Action issued in Chinese Patent Appln. Serial No. 201880081296.0, dated Jul. 5, 2021, with English translation, 9 pages.

(Continued)

*Primary Examiner* — Jessica Cahill
(74) *Attorney, Agent, or Firm* — Hayes Soloway P.C.

(57) ABSTRACT

A capacity control valve includes a valve housing provided with a Ps port through which a suction fluid at a suction pressure passes and a Pc port through which a control fluid at a control pressure passes; a valve body configured to close and open a communication between the Pc port and the Ps port by a driving force of a solenoid; and a pressure sensitive body that applies a biasing force to the valve body according to a surrounding fluid pressure. An accommodation chamber in which a rear side portion of the valve body is accommodated is provided with a supply passage to which suction fluid is supplied.

4 Claims, 5 Drawing Sheets

(51) Int. Cl.
  *F16K 27/04* (2006.01)
  *F16K 31/06* (2006.01)
(58) Field of Classification Search
  CPC ...... F04B 2027/1818; F04B 2027/1831; F04B 2027/1859
  See application file for complete search history.

(56) References Cited

U.S. PATENT DOCUMENTS

| | | | |
|---|---|---|---|
| 3,360,304 A | 12/1967 | Adams | B61K 7/12 |
| 3,483,888 A | 12/1969 | Hugo | F16K 15/046 |
| 4,364,615 A | 12/1982 | Euler | F16C 27/04 |
| 4,579,145 A | 4/1986 | Leiber | F16H 61/0251 |
| 4,615,358 A | 10/1986 | Hammond | F15B 13/0402 |
| 4,895,192 A | 1/1990 | Mortenson | F01M 11/04 |
| 4,917,150 A | 4/1990 | Koch | F16K 31/0606 |
| 4,979,542 A | 12/1990 | Mesenich | F02M 42/027 |
| 4,998,559 A | 3/1991 | McAuliffe | F16H 61/0251 |
| 5,060,695 A | 10/1991 | McCabe | G05D 16/2024 |
| 5,217,047 A | 6/1993 | McCabe | F16H 16/0251 |
| 5,263,694 A | 11/1993 | Smith | B60G 15/068 |
| 5,702,235 A | 12/1997 | Hirota | F04B 27/1804 |
| 5,778,932 A | 7/1998 | Alexander | G05D 16/2024 |
| 6,010,312 A | 1/2000 | Suitou | F04B 27/1804 |
| 6,161,585 A | 12/2000 | Kolchinsky | F05D 16/2024 |
| 6,361,283 B1 | 3/2002 | Ota | F04B 27/1084 |
| 6,481,976 B2* | 11/2002 | Kimura | F04B 27/1804 137/454.6 |
| 7,533,687 B2 | 5/2009 | Uemura | F16K 27/048 |
| 8,021,124 B2 | 9/2011 | Umemura | F04B 27/1804 |
| 8,079,827 B2 | 12/2011 | Iwa | F04B 27/1804 |
| 8,225,818 B1 | 7/2012 | Stephens | F15B 13/0442 |
| 8,651,826 B2 | 2/2014 | Futakuchi | F04B 27/1804 |
| 9,022,346 B2 | 5/2015 | Najmolhoda | F16K 31/0613 |
| 9,027,598 B2 | 5/2015 | Schneider | F16K 31/0613 |
| 9,132,714 B2 | 9/2015 | Futakuchi | F04B 27/1804 |
| 9,297,373 B2 | 3/2016 | Bagagli | F16K 15/026 |
| 9,400,027 B2 | 7/2016 | Imaizumi | F16F 1/32 |
| 9,453,518 B2 | 9/2016 | Schulz | F15B 13/043 |
| 9,581,149 B2* | 2/2017 | Ota | F04B 27/1804 |
| 9,581,150 B2* | 2/2017 | Ota | F04B 1/295 |
| 9,732,874 B2 | 8/2017 | Saeki | F16K 31/0603 |
| 9,874,286 B2 | 1/2018 | Bagagli et al. | F16K 15/12 |
| 10,113,539 B2* | 10/2018 | Sugamura | F04B 27/1804 |
| 10,519,944 B2* | 12/2019 | Taguchi | F04B 27/1804 |
| 10,557,463 B2 | 2/2020 | Sugamura | F04B 27/1804 |
| 10,690,125 B2 | 6/2020 | Hayama | F04B 27/18 |
| 10,784,804 B2 | 9/2020 | Sasaki | H02P 25/022 |
| 10,837,431 B2* | 11/2020 | Tonegawa | F04B 49/22 |
| 2001/0003573 A1* | 6/2001 | Kimura | F04B 27/1804 251/129.02 |
| 2002/0134444 A1 | 9/2002 | Isobe | F16K 27/041 |
| 2003/0145615 A1 | 8/2003 | Sasaki | F16K 31/0637 |
| 2003/0202885 A1* | 10/2003 | Taguchi | F04B 27/1804 417/213 |
| 2004/0045305 A1* | 3/2004 | Murase | F25B 49/022 62/217 |
| 2004/0165994 A1* | 8/2004 | Umemura | F04B 27/1804 417/222.2 |
| 2005/0076959 A1 | 4/2005 | Yamamoto | F16K 31/0624 |
| 2005/0151310 A1 | 7/2005 | Rodeffer | F16F 1/32 |
| 2007/0214814 A1 | 9/2007 | Umemura et al. | |
| 2007/0264134 A1 | 11/2007 | Hirota | F04B 27/1804 |
| 2008/0138213 A1 | 6/2008 | Umemura et al. | 417/222.2 |
| 2008/0175727 A1 | 7/2008 | Umemura et al. | F04B 49/22 |
| 2009/0108221 A1 | 4/2009 | Umemura et al. | 251/129.15 |
| 2009/0114871 A1 | 5/2009 | Iwa | F04B 27/14 |
| 2009/0183786 A1 | 7/2009 | Iwa | 137/487.5 |
| 2009/0256091 A1 | 10/2009 | Nordstrom | F16K 31/0613 |
| 2010/0282991 A1 | 11/2010 | Okamoto | F16K 31/02 |
| 2011/0061749 A1 | 3/2011 | Okamoto | F16K 31/0655 |
| 2011/0089352 A1 | 4/2011 | Morgan | F16K 11/0716 |
| 2012/0056113 A1 | 3/2012 | Tano | F04B 27/1804 |
| 2012/0198992 A1 | 8/2012 | Futakuchi et al. | 91/505 |
| 2012/0198993 A1* | 8/2012 | Fukudome | F04B 27/1804 91/505 |
| 2012/0211686 A1 | 8/2012 | Okamoto | F16K 31/0655 |
| 2013/0291963 A1 | 11/2013 | Futakuchi et al. | 137/487.5 |
| 2014/0099214 A1 | 4/2014 | Fukudome | 417/222.2 |
| 2014/0130916 A1 | 5/2014 | Saeki | F16K 31/0613 |
| 2014/0294632 A1 | 10/2014 | Kondo et al. | 417/434 |
| 2014/0369862 A1* | 12/2014 | Ota | F04B 1/295 417/222.2 |
| 2015/0021131 A1 | 1/2015 | Wootten | F16F 9/348 |
| 2015/0027573 A1 | 1/2015 | Ochiai | F15B 13/0402 |
| 2015/0044067 A1 | 2/2015 | Ota et al. | F04B 27/1804 |
| 2015/0068628 A1 | 3/2015 | Iwa | 137/625.65 |
| 2015/0104334 A1* | 4/2015 | Ota | F04B 27/12 417/222.2 |
| 2015/0275874 A1 | 10/2015 | Ota | F04B 27/1804 |
| 2015/0345655 A1 | 12/2015 | Higashidozono | 137/624.27 |
| 2016/0053755 A1 | 2/2016 | Taguchi | F04B 49/22 |
| 2016/0290326 A1 | 10/2016 | Sugamura et al. | F04B 27/1804 |
| 2017/0284562 A1* | 10/2017 | Hayama | F16K 25/04 |
| 2018/0156345 A1 | 6/2018 | Kanda | F15B 13/0431 |
| 2018/0187793 A1 | 7/2018 | Futakuchi | F04B 39/08 |
| 2018/0291888 A1* | 10/2018 | Tonegawa | F16K 31/0624 |
| 2019/0162175 A1 | 5/2019 | Higashidozono | F04B 27/18 |
| 2020/0032781 A1 | 1/2020 | Higashidozono | F16K 31/0624 |
| 2020/0309105 A1 | 10/2020 | Hayama et al. | F04B 27/18 |
| 2020/0318624 A1 | 10/2020 | Hayama | F04B 27/18 |
| 2020/0332786 A1 | 10/2020 | Hayama | F04B 27/1804 |
| 2020/0362974 A1 | 11/2020 | Hayama et al. | F16K 11/24 |
| 2020/0370545 A1 | 11/2020 | Hayama et al. | F04B 27/18 |
| 2021/0372396 A1 | 12/2021 | Kurihara | G05D 7/0635 |

FOREIGN PATENT DOCUMENTS

| | | | |
|---|---|---|---|
| CN | 111417780 | 7/2020 | F04B 27/18 |
| EP | 2594794 | 5/2013 | F04B 27/18 |
| EP | 3726054 | 10/2020 | F04B 27/18 |
| JP | 6-26454 | 2/1994 | F04B 27/08 |
| JP | 2001165055 | 6/2001 | F04B 27/14 |
| JP | 2004003468 | 1/2004 | F04B 27/14 |
| JP | 2005307817 | 11/2005 | F04B 27/14 |
| JP | 2007247512 | 9/2007 | F04B 27/14 |
| JP | 2008157031 | 7/2008 | F04B 27/14 |
| JP | 2009275550 | 11/2009 | F04B 49/00 |
| JP | 2012144986 | 8/2012 | F04B 27/14 |
| JP | 2012211579 | 11/2012 | F04B 27/14 |
| JP | 5167121 | 3/2013 | F04B 27/14 |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014-194180 | 10/2014 | F04B 27/14 |
| JP | 2015-75054 | 4/2015 | F04B 27/14 |
| JP | 2015-1168 | 5/2015 | F04B 27/14 |
| JP | 2015-137546 | 7/2015 | F04B 27/14 |
| JP | 2015178795 | 10/2015 | F04B 27/14 |
| JP | 5983539 | 8/2016 | F04B 27/18 |
| JP | 2016196825 | 11/2016 | F04B 27/18 |
| JP | 2016196876 | 11/2016 | F04B 27/18 |
| JP | 2016205404 | 12/2016 | F04B 27/18 |
| JP | 6135521 | 5/2017 | F04B 27/18 |
| JP | 2017089832 | 5/2017 | F16K 31/06 |
| JP | 2018-179087 | 11/2018 | F16K 31/06 |
| WO | WO2006090760 | 8/2006 | F04B 27/18 |
| WO | WO2007119380 | 10/2007 | F04B 27/14 |
| WO | WO2009025298 | 2/2009 | F16K 31/06 |
| WO | WO2011114841 | 9/2011 | F04B 27/14 |
| WO | WO2012077439 | 6/2012 | F04B 27/14 |
| WO | WO2014119594 | 8/2014 | F04B 27/14 |
| WO | WO2014148367 | 9/2014 | F16K 31/06 |

OTHER PUBLICATIONS

Extended European Search Report issued in European Patent Appln. Serial No. 18896700.4, dated Aug. 12, 2021, 8 pages.
International Preliminary Report on Patentability issued in PCT/JP2018/047716, dated Jun. 30, 2020, 8 pages.

(56) References Cited

OTHER PUBLICATIONS

International Search Report and Written Opinion issued in PCT/JP2018/047716, dated Mar. 26, 2019, with English translation, 14 pages.
International Preliminary Report on Patentability issued in PCT/JP2014/051901, dated Aug. 13, 2015, 7 pages.
International Search Report issued in PCT/JP2014/051901, dated Apr. 18, 2014, 4 pages.
International Preliminary Report on Patentability, International Search Report and Written Opinion issued in PCT/JP2019/045731, dated Feb. 4, 2020, 21 pages.
Notice of Allowance issued in related U.S. Appl. No. 16/772,703, dated Oct. 13, 2021, 6 pages.
European Official Action issued in related European Patent Application Serial No. 18885296.6, dated Jan. 21, 2022, 4 pages.
International Search Report issued in PCT/JP20181004500, dated May 15, 2018, 12 pages.
International Preliminary Report on Patentability issued in PCT/JP2018/004500, dated Aug. 20, 2019, 4pages.
International Search Report issued in PCT/JP2018/041768, dated Jan. 22, 2019, 12 pages.
International Preliminary Report on Patentability issued in PCT/JP2018/041768, dated May 19, 2020, 6 pages.
International Search Report issued in PCT/JP2018/002084, dated Apr. 17, 2018, 11 pages.
International Preliminary Report on Patentability issued in PCT/JP2018/002084, dated Jul. 30, 2019, 4 pages.
International Search Report issued in PCT/JP2018/047693, dated Mar. 19, 2019, 11 pages.
International Preliminary Report on Patentability issued in PCT/JP2018/047693, dated Jun. 30, 2020, 4 pages.
International Search Report issued in PCT/JP2018/047694, dated Mar. 19, 2019, 20 pages.
International Preliminary Report on Patentability issued in PCT/JP2018/047694, dated Jun. 30, 2020, 7 pages.
International Search Report issued in PCT/JP2018/045010, dated Feb. 26, 2019, 11 pages.
International Preliminary Report on Patentability issued in PCT/JP2018/045010, dated Jun. 9, 2020, 4 pages.
International Search report issued in PCT/JP2019/001569, dated Apr. 16, 2019, 20 pages.
International Preliminary Report on Patentability issued in PCT/P2019/001569, dated Oct. 15, 2018, 7 pages.
Official Action issued in related U.S. Appl. No. 16/957,340, dated Feb. 4, 2022 (18 pgs).
Official Action issued in related U.S. Appl. No. 16/957,340, dated Sep. 20, 2021 (18 pgs).
Notice of Allowance issued in related U.S. Appl. No. 16/961,620, dated Feb. 9, 2022 (6 pgs).
Official Action issued in related U.S. Appl. No. 16/961,620, dated Aug. 5, 2021 (7 pgs).
U.S. Appl. No. 16/480,281, filed Jul. 23, 2019, Higashidozono et al.
U.S. Appl. No. 16/483,621, filed Aug. 5, 2019, Higashidozono et al.
U.S. Appl. No. 16/763,800, filed May 13, 2020, Hayama et al.
U.S. Appl. No. 16/766,096, filed May 21, 2020, Kurihara et al.
U.S. Appl. No. 16/957,340, filed Jun. 23, 2020, Hayama et al.
U.S. Appl. No. 16/957,344, filed Jun. 23, 2020, Hayama et al.
U.S. Appl. No. 16/961,620, filed Jul. 10, 2020, Hayama et al.
U.S. Appl. No. 17/293,435, filed May 12, 2021, Hayama et al.
U.S. Appl. No. 16/772,703, filed Jun. 12, 2020, Hayama et al.
U.S. Appl. No. 14/431,270, filed Mar. 25, 2015, Higashidozono et al.
European Official Action issued in related European Patent Application Serial No. 18897846.4, dated Apr. 14, 2022 (5 pgs).
European Official Action issued in related European Patent Application Serial No. 19890548.1, dated May 24, 2022 (6 pgs).
European Official Action issued in related European Patent Application Serial No. 18884020.1, dated Jun. 28, 2022 (4 pgs).
Korean Official Action issued in related Korean Patent Application Serial No. 10-2020-7013914, dated Mar, 15, 2022 (5 pgs).
Chinese Office Action issued in Chinese Patent Appln. Serial No. 201880080867.9, dated Mar. 16, 2022, with English translation, 13 pages.
Chinese Office Action issued in Chinese Patent Appln. Serial No. 201880072030.X, dated Jun. 6, 2022, with English translation, 12 pages.
Chinese Office Action issued in Chinese Patent Appln. Serial No. 201980075007.0, dated Jun. 6, 2022, with English translation, 8 pages.
Japanese Office Action issued in Japanese Patent Appln. Serial No. 2019-562060, dated May 10, 2022, with English translation, 8 pages.
Japanese Office Action issued in Japanese Patent Appln. Serial No. 2019-562061, dated May 10, 2022, with English translation, 10 pages.
Japanese Office Action issued in Japanese Patent Appln. Serial No. 2019-559188, dated Jul. 13, 2022, with English translation, 9 pages.
International Search Report and Written Opinion with translation issued in PCT/JP2019/001570, dated Jul. 25, 2019 (19 pages).
International Preliminary Report on Patentability with translation issued in PCT/JP2019/001570, dated Jul. 28, 2020 (6 pages).
International Search Report and Written Opinion with translation issued in PCT/JP2018/043652, dated Feb. 19, 2019 (21 pages).
International Preliminary Report on Patentability with translation issued in PCT/JP2018/043652, dated Jun. 2, 2020 (7 pages).
International Search Report and Written Opinion with translation issued in PCT/JP2018/045782, dated Feb. 26, 2019 (11 pages).
International Preliminary Report on Patentability with translation issued in PCT/JP2018/045782, dated Jun. 16, 2020 (4 pages).
Official Action issued in related U.S. Appl. No. 16/772,703, dated Jul. 21, 2021 (6 pgs).
Official Action issued in related U.S. Appl. No. 16/961,627, dated Oct. 26, 2021 (24 pgs).
Official Action issued in related U.S. Appl. No. 16/766,124, dated Oct. 27, 2021 (11 pgs).
Notice of Allowance issued in related U.S. Appl. No. 16/766,124, dated Apr. 4, 2022 (5 pgs).
Notice of Allowance issued in related U.S. Appl. No. 16/957,340, dated May 24, 2022 (16 pgs).
Notice of Allowance issued in related U.S. Appl. No. 16/961,627, dated May 5, 2022 (19 pgs).
Official Action issued in related U.S. Appl. No. 16/957,344, dated Mar. 29, 2022 (19 pgs).
Official Action issued in related U.S. Appl. No. 16/763,800, dated Jun. 8, 2022 (9 pgs).
Official Action issued in related U.S. Appl. No. 16/480,281, dated Jun. 8, 2022 (15 pgs).
Official Action issued in related U.S. Appl. No. 16/766,096, dated May 27, 2022 (7 pgs).
Official Action issued in related U.S. Appl. No. 16/771,548, dated Dec. 8, 2021 (15 pgs).
Official Action issued in related U.S. Appl. No. 16/771,548, dated Jun. 7, 2022 (11 pgs).
Official Action issued in related U.S. Appl. No. 16/483,621, dated Jun. 17, 2022 (13 pgs).

* cited by examiner

CAPACITY CONTROL VALVE

TECHNICAL FIELD

The present invention relates to a capacity control valve that variably controls the capacity of a working fluid, for example, to a capacity control valve that controls the discharge amount of a variable displacement compressor, which is used in an air conditioning system of an automobile, according to pressure.

BACKGROUND ART

A variable displacement compressor used in an air conditioning system of an automobile or the like includes a rotary shaft that is rotationally driven by an engine; a swash plate that is coupled to the rotary shaft such that the inclination angle of the swash plate with respect thereto is variable; a piston for compression coupled to the swash plate; and the like. When the inclination angle of the swash plate is changed, the stroke amount of the piston is changed to control the discharge amount of a fluid. The capacity control valve, of which the opening and closing is driven by electromagnetic force, appropriately controls the internal pressure of a control chamber while using a suction pressure Ps of a suction chamber that suctions the fluid, a discharge pressure Pd of a discharge chamber that discharges the fluid pressurized by the piston, and a control pressure Pc of the control chamber that accommodates the swash plate, so that the inclination angle of the swash plate can be continuously changed.

During continuous driving of the variable displacement compressor, the capacity control valve performs normal control where a valve body is moved in an axial direction by electromagnetic force which is generated in a solenoid when energization is controlled by a control computer, so that a main valve is opened and closed to adjust the control pressure Pc of the control chamber of the variable displacement compressor.

In addition, there is known a capacity control valve in which since when a method by which an inlet side of the variable displacement compressor, namely, communication between the discharge chamber and the control chamber is controlled is adopted, the responsiveness can be improved but the circulation amount of a refrigerant required for control is increased to deteriorate the operation efficiency of the variable displacement compressor, a method by which an outlet side of the variable displacement compressor, namely, communication between the control chamber and the suction chamber is controlled is adopted, so that the circulation amount of the refrigerant required for control is reduced to improve the operation efficiency of the variable displacement compressor (refer to Patent Circulation 1).

The capacity control valve of Patent Citation 1 mainly includes a valve housing provided with a Pc port through which a control fluid at the control pressure Pc passes and a Ps port through which a suction fluid at the suction pressure Ps passes; a valve body that forms a CS valve, which comes into contact with and separates from a valve seat formed in the valve housing, to open and close communication between the Pc port and the Ps port; a bellows that is provided in a pressure sensitive chamber, in which the Ps port is formed, to apply biasing force to the valve body according to a surrounding pressure; and a solenoid that applies biasing force to the valve body against the biasing force of the bellows. When the value of a current applied to the solenoid is increased, the CS valve is opened. In addition, since the force applied to the valve body from the bellows is changed according to the pressure of the pressure sensitive chamber, the responsiveness is improved.

CITATION LIST

Patent Literature

Patent Citation 1: JP 6-26454 A (page 2 and FIG. 2)

SUMMARY OF INVENTION

Technical Problem

However, according to Patent Citation 1, since the control pressure Pc is introduced to an accommodation space of a plunger from the Pc port through a gap between a coupling bar coupling the plunger and the valve body and a shaft hole of the valve housing, into which the coupling bar is inserted, the suction pressure Ps from a pressure sensitive chamber side and the control pressure Pc from the accommodation space are applied to the valve body, and thus when the pressure difference between the suction pressure Ps and the control pressure Pc is changed, the amount of control of the valve body which depends on the current value applied to the solenoid is changed and the accuracy of control of the valve body is deteriorated, which is a problem.

The invention has been made in light of such a problem, and an object of the invention is to provide a capacity control valve capable of precisely controlling a valve body.

Solution to Problem

In order to solve the foregoing problem, according to the present invention, there is provided a capacity control valve including: a valve housing provided with a Ps port through which a suction fluid at a suction pressure passes and a Pc port through which a control fluid at a control pressure passes; a valve body that forms a main valve in cooperation with a valve seat, the valve body coming into contact with and separating from the valve seat, to close and open a communication between the Pc port and the Ps port by a driving force of a solenoid; and a pressure sensitive body that applies a biasing force to the valve body according to a fluid pressure of a fluid surrounding the pressure sensitive body. The suction fluid is supplied from the Ps port to a pressure sensitive chamber in which the pressure sensitive body is disposed. An accommodation chamber in which a rear side portion of the valve body is accommodated is provided with a supply passage to which the suction fluid is supplied. According to the aforesaid feature of the present invention, since the suction pressures are applied to the valve body from both of the pressure sensitive chamber and the accommodation chamber, the driving force of the solenoid can be transmitted to the valve body in a state where the influence of the pressures is suppressed; and thereby, the valve body can be precisely controlled according to a current applied to the solenoid.

It may be preferable that the valve body is separably coupled to the pressure sensitive body. According to this preferable configuration, since the biasing force of the pressure sensitive body according to the surrounding fluid pressure can be directly balanced with the driving force of the solenoid, the valve body can be more precisely controlled.

It may be preferable that the supply passage is a communication hole through which the pressure sensitive chamber and the accommodation chamber communicate with each other. According to this preferable configuration, since the suction pressures applied to the valve body from both of the pressure sensitive chamber and the accommodation chamber are easily equalized, the valve body can be more precisely controlled.

It may be preferable that the communication hole is provided in the valve housing. According to this preferable configuration, the communication hole with a large flow passage cross-sectional area can be secured while the structural strength is maintained.

It may be preferable that a groove extending in a circumferential direction is formed in a sliding portion between the valve body and the valve housing. According to this preferable configuration, since the labyrinth effect of the groove can suppress the control fluid at the control pressure from leaking to the accommodation chamber through the sliding portion between the valve body and the valve housing, the accommodation chamber is easily maintained at the suction pressure.

It may be preferable that in the valve body, an effective area of a valve opening may be equal to an effective area of the sliding portion. According to this preferable configuration, since the control pressures applied to the valve body are cancelled out, the valve body can be more precisely controlled.

It may be preferable that the capacity control valve further includes a spring that, biases the valve body against the driving force of the solenoid. According to this preferable configuration, the main valve can be reliably opened in a de-energized state.

DESCRIPTION OF EMBODIMENTS

Modes for implementing a capacity control valve according to the invention will be described below based on embodiments.

First Embodiment

A capacity control valve according to a first embodiment of the present invention will be described with reference to FIGS. 1 to 3. In the following description, right and left sides of FIG. 1 as viewed from a front side are right and left sides of the capacity control valve.

A capacity control valve V of the invention is assembled into a variable displacement compressor (unillustrated) used in an air conditioning system of an automobile or the like to variably control the pressure of a working fluid (hereinafter, simply referred to as a "fluid") which is a refrigerant, so that the discharge amount of the variable displacement compressor is controlled to adjust the cooling capacity of the air conditioning system to a desired cooling capacity.

First, the variable displacement compressor will be described. The variable displacement compressor includes a casing including a discharge chamber, a suction chamber, a control chamber, and a plurality of cylinders. Incidentally, the variable displacement compressor is provided with a communication passage through which the discharge chamber and the control chamber communicate directly with each other, and the communication passage is provided with a fixed orifice 9 (refer to FIG. 1) that balances the pressures of the discharge chamber and the control chamber.

In addition, the variable displacement compressor includes a rotary shaft that is rotationally driven by an engine (unillustrated) installed outside the casing; a swash plate that is eccentrically coupled to the rotary shaft by a hinge mechanism in the control chamber; and a plurality of pistons that are coupled to the swash plate and are reciprocatably fitted into the cylinders. The capacity control valve V, of which the opening and closing is driven by electromagnetic force, appropriately controls the internal pressure of the control chamber while using a suction pressure Ps of the suction chamber that suctions the fluid, a discharge pressure Pd of the discharge chamber that discharges the fluid pressurized by the pistons, and a control pressure Pc of the control chamber that accommodates the swash plate, so that the inclination angle of the swash plate is continuously changed; and thereby, the stroke amounts of the pistons are changed to control the discharge amount of the fluid.

Figure 1:
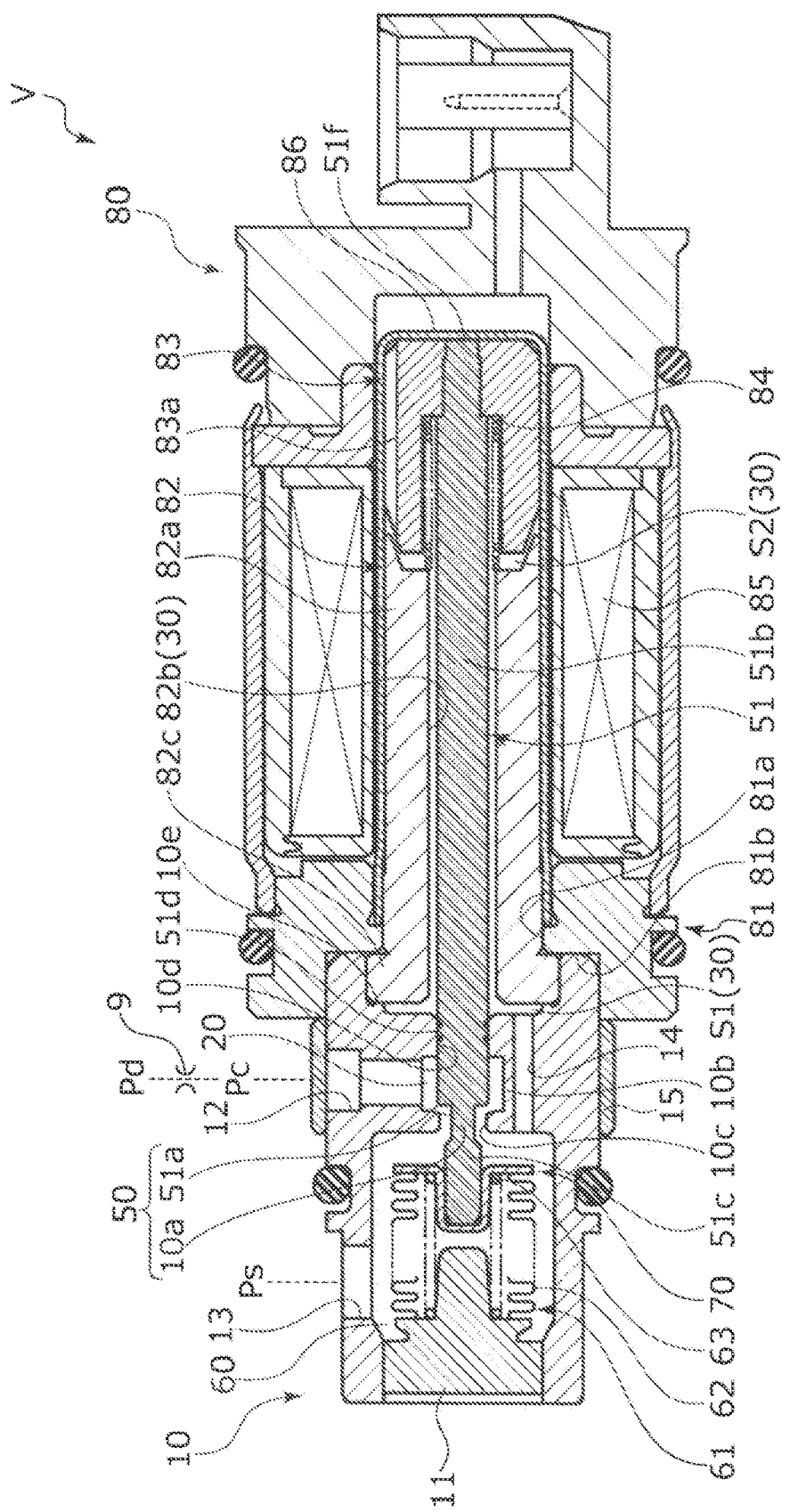
FIG. 1 is a cross-sectional views illustrating a state where a main valve is opened when a capacity control valve according to a first embodiment of the present invention is in a de-energized state.

As illustrated in FIG. 1, in the capacity control valve V assembled into the variable displacement compressor, a current with which a coil 85 forming a solenoid 80 is to be energized is adjusted to control the opening and closing of a main valve 50 in the capacity control valve V, so that the fluid flowing out form the control chamber is controlled; and thereby, the control pressure Pc in the control chamber is controlled.

In the present embodiment, the main valve 50 includes a rod 51 as a valve body and a valve seat 10a that is formed in an inner peripheral surface of a valve housing 10, and a step portion 51a on a left side in an axial direction of the rod 51 comes into contact with and separates from the valve seat 10a to open and close the main valve 50.

Next, the structure of the capacity control valve V will be described. As illustrated in FIG. 1, the capacity control valve V mainly includes the valve housing 10 made of a metallic material or a resin material; the rod 51 that is disposed in the valve housing 10 so as to be reciprocatable in the axial direction; a pressure sensitive body 61 that applies rightward axial biasing force to the rod 51 according to a surrounding fluid pressure; and the solenoid 80 that is connected to the valve housing 10 to apply driving force to the rod 51.

As illustrated in FIG. 1, the solenoid 80 mainly includes a casing 81 having an opening portion 81a that is open leftward in the axial direction; a fixed core 82 that has a substantially cylindrical shape, and is inserted into the opening portion 81a of the casing 81 from the left in the axial direction to be fixed to an inner diameter side of the casing 81; the rod 51 that is inserted into the fixed core 82 so as to be reciprocatable in the axial direction; a movable core 83 that is inserted into and fixed to a right axial end portion of the rod 51; a coil spring 84 as a spring that is provided between the fixed core 82 and the movable core 83 to bias the movable core 83 rightward in the axial direction, namely, a valve opening direction of the main valve 50; and the coil 85 for excitation that is wound around the outside of the fixed core 82 via a bobbin.

An inner diameter side of a left axial end of the casing 81 is recessed rightward in the axial direction to form a recessed portion 81b, and a right axial end portion of the valve housing 10 is inserted into and fixed to the recessed portion 81b in a substantially sealed manner.

The fixed core 82 is formed of a rigid body made of a magnetic material such as iron or silicon steel, and includes a cylindrical portion 82a provided with an insertion hole 82b into which a right side in the axial direction of a large diameter portion 51b of the rod 51 extending in the axial direction is inserted, and a flange portion 82c that has an annular shape and extends outward in a radial direction from an outer peripheral surface of a left axial end portion of the cylindrical portion 82a.

In addition, the fixed core 82 is inserted into and fixed to a recessed portion 10e formed by recessing an inner diameter side of a right axial end of the valve housing 10 leftward in the axial direction, the right axial end being inserted into and fixed to the recessed portion 81b of the casing 81 in a state where a right axial end surface of the flange portion 82c comes into contact with a bottom surface of the recessed portion 81b of the casing 81 from the left in the axial direction.

As illustrated in FIG. 1, in the capacity control valve V, the fixed core 82 and the valve housing 10 are mounted to the casing 81, so that a space S1 is formed by a left axial end surface of the flange portion 82c of the fixed core 82 and an inner peripheral surface of the recessed portion 10e of the valve housing 10. In addition, in the capacity control valve V, a cup 86 having a bottomed cylindrical shape is externally fitted to the cylindrical portion 82a of the fixed core 82 from the right in the axial direction in a substantially sealed manner, so that a space S2 is formed by a right axial end of the cylindrical portion 82a and an inner peripheral surface or the cup 86. In addition, the space S1 communicates with the space S2 via a gap between an inner peripheral surface of the insertion hole 82b of the fixed core 82 and an outer peripheral surface of the rod 51, and the spaces S1 and S2 and the insertion hole 82b of the fixed core 82 form an accommodation chamber 30 in which a rear side of the rod 51 is accommodated. Incidentally, a groove 83a extending in the axial direction is formed in an outer peripheral surface of the movable core 83 disposed in the space S2, and the fluid flows between a right axial end of the movable core 83 and a bottom surface of the cup 86.

Figure 2:
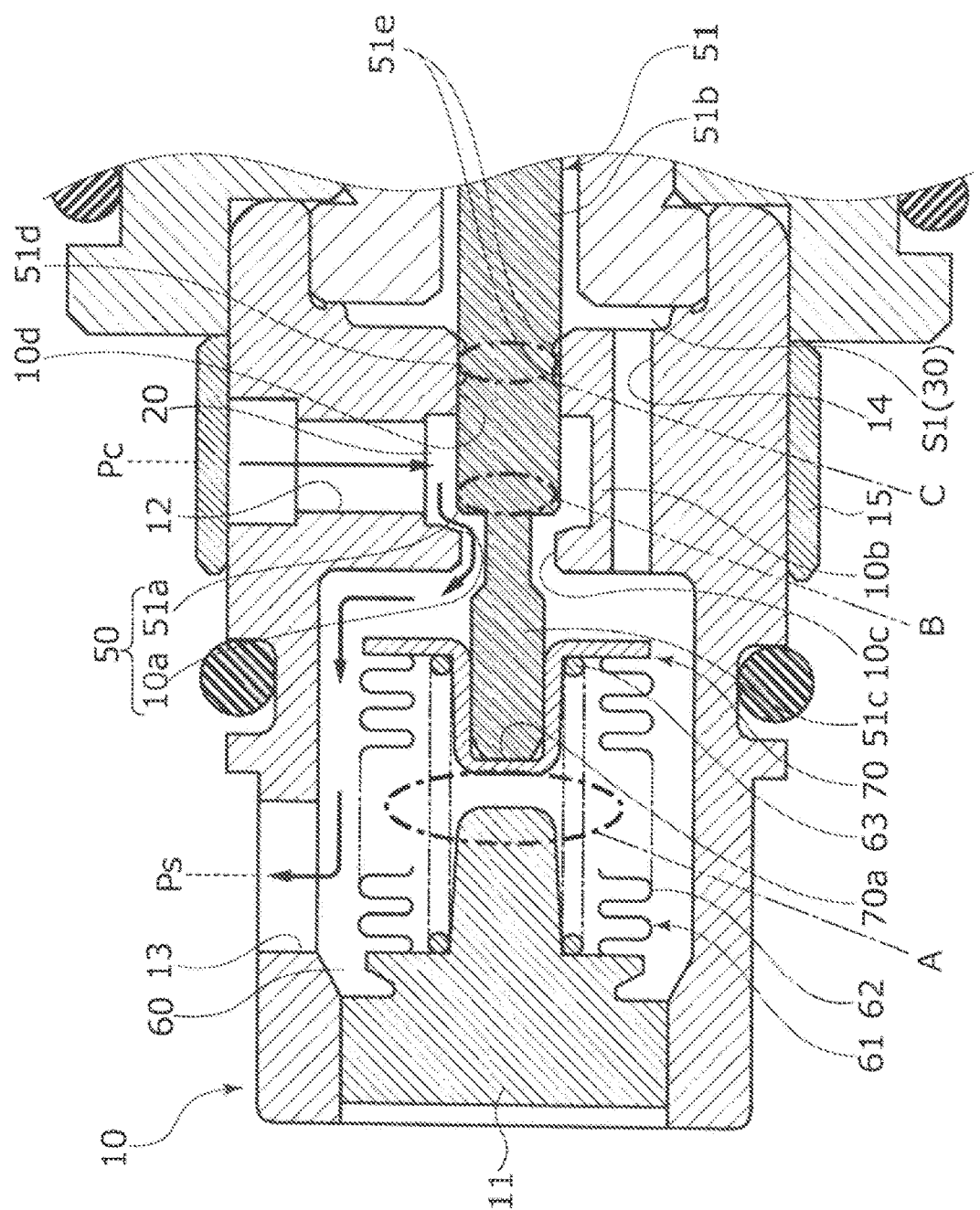
FIG. 2 is an enlarged cross-sectional view of FIG. 1 illustrating a state where the main valve is opened when the capacity control valve in the first embodiment is in a de-energized state.
Figure 3:
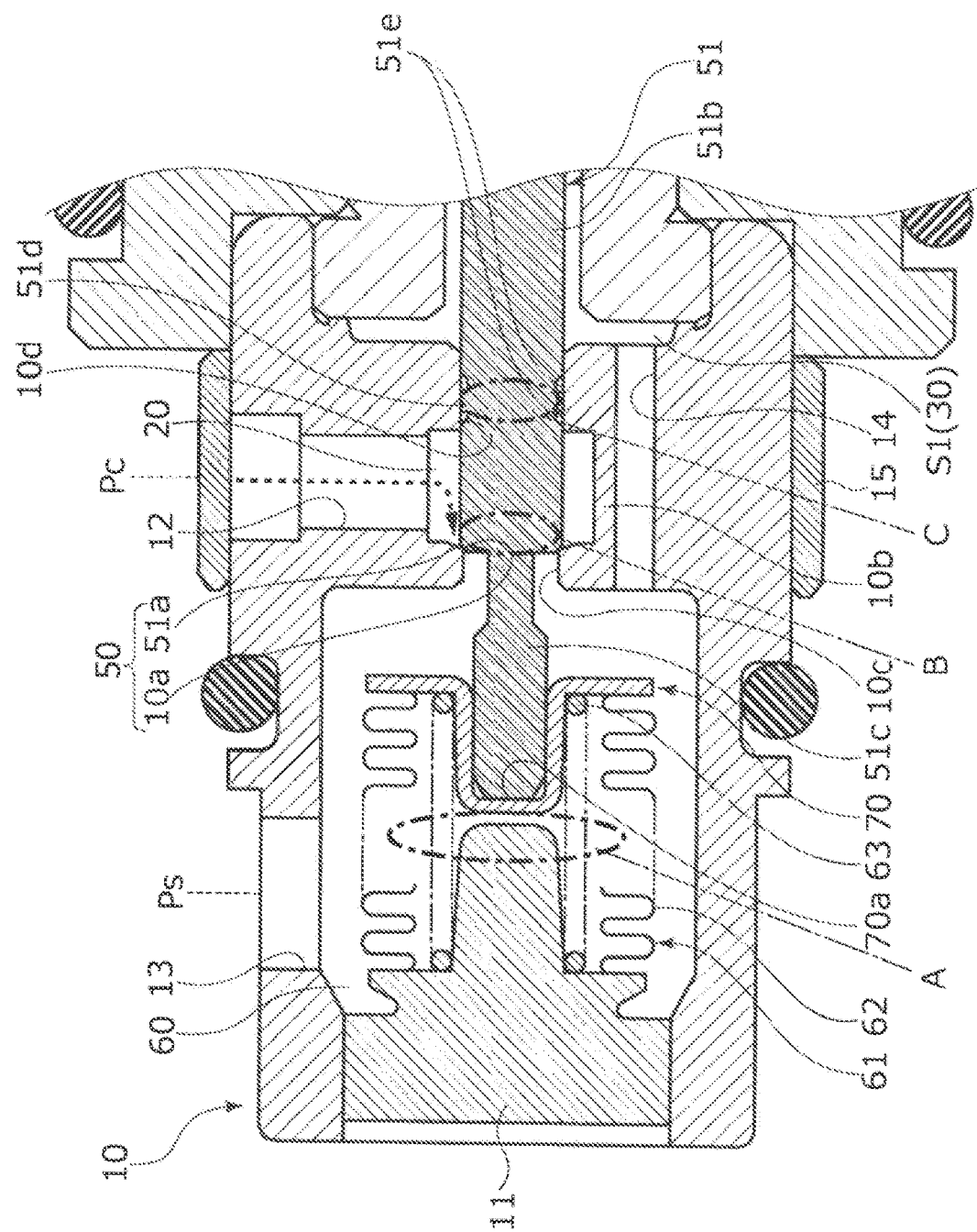
FIG. 3 is an enlarged cross-sectional view illustrating a state where the main valve is closed when the capacity control valve in the first embodiment is in an energized state (e.g., during normal control).

As illustrated in FIGS. 1 to 3, a partition adjustment member 11 is press-fitted into a left axial end portion of the valve housing 10 in a substantially sealed manner, so that the valve housing 10 has a substantially bottomed cylindrical shape. Incidentally, the partition adjustment member 11 can adjust the installation position in the axial direction of the valve housing 10 to adjust the biasing force of the pressure sensitive body 61.

In addition, a partition wall 10b extending in the radial direction is provided in the right axial end portion of the valve housing 10, a shaft hole 10c into which a smell diameter portion 51c of the rod 51 is inserted is formed on a left side in the axial direction of the partition wall 10b, and a guide hole 10d as a sliding portion into which the large diameter portion 51b of the rod 51 is inserted is formed on a right side in the axial direction of the partition wall 10b. Incidentally, the hole diameter of the shaft hole 10c is smaller than the hole diameter of the guide hole 10d, and a valve seat 10a with and from which the step portion 51a of the rod 51 comes into contact and separates is formed on a right side in the axial direction of the shaft hole 10c. In addition, an inner peripheral surface of the guide hole 10d and a sliding portion 51d of the rod 51 are slightly separated from each other in the radial direction, so that a very small gap is formed therebetween, and the rod 51 is smoothly movable relative to the valve housing 10 in the axial direction. In addition, a communication passage extending in the radial direction is formed in the partition wall 10b, and the communication passage serves as a Pc port 12.

In addition, inside the valve housing 10, a main valve chamber 20 in which the step portion 51a of the rod 51 is disposed is formed between the shaft hole 10c and the guide hole 10d that are formed in the partition wall 10b, and a pressure sensitive chamber 60 in which the pressure sensitive body 61 is disposed is formed between the partition wall 10b and the partition adjustment member 11. In such a manner, the main valve chamber 20 is disposed between the pressure sensitive chamber 60 and the accommodation chamber 30.

In addition, the valve housing 10 is provided with a Pc port 12 through which the main valve chamber 20 and the control chamber of the variable displacement compressor communicates with each other, and a Ps port 13 through which the pressure sensitive chamber 60 and the suction chamber of the variable displacement compressor communicates with each other. Incidentally, a filter 15 is externally fitted to the valve housing 10 at an axial position where the Pc port 12 is formed, to prevent foreign matter from infiltrating into the main valve chamber 20 from the control chamber of the variable displacement compressor.

In addition, a communication hole 14 as a supply passage penetrating through the partition wall 10b in the axial direction is provided in the valve housing 10 at a position not to interfere with the main valve chamber 20 and the Pc port 12, and the pressure sensitive chamber 60 communicates with the accommodation chamber 30 via the communication hole 14. Accordingly, the suction pressure Ps from the Ps port 13 is supplied to the accommodation chamber 30 via the pressure sensitive chamber 60 and the communication hole 14. Incidentally, it is preferable that the flow passage cross-sectional area of the communication hole 14 is set to a size such that the suction pressures Ps in the pressure sensitive chamber 60 and the accommodation chamber 30 can be substantially equal, for example, a flow passage area which is the half or more of the flow passage area of a Pc-Ps flow passage (to be described later) or 1 mm or more of diameter of a hole.

As illustrated in FIG. 1, the rod 51 mainly includes the large diameter portion 51b that is inserted into the guide hole 10d of the valve housing 10 and the insertion hole 82b of the fixed core 82 forming the solenoid 80, and the small diameter portion 51c that is formed on a left side in the axial direction of the large diameter portion 51b to have a smaller diameter than the large diameter portion 51b and is inserted into the shaft hole 10c of the valve housing 10. Incidentally, the movable core 83 forming the solenoid 80 is externally fitted and fastened to a right axial end portion of the large diameter portion 51b, so that the movable core 83 and the rod 51 are movable together in the axial direction, and a right axial end 51f of the rod 51 is exposed from the right axial end of the movable core 83.

As illustrated in FIGS. 2 and 3, the sliding portion 51d that slides against the inner peripheral surface of the guide hole 10d of the valve housing 10 is formed in an outer peripheral surface of a left axial end portion of the large diameter portion 51b. Incidentally, two grooves 51e having an annular shape and extending in a circumferential direction are formed in the sliding portion 51d, and the scalability of a very small gap between the inner peripheral surface of the guide hole 10d of the valve housing 10 and the sliding portion 51d is improved by the labyrinth effect of the grooves 51e. Accordingly, the control pressure Pc is prevented from being introduced to the accommodation chamber 30 from the main valve chamber 20 of the valve housing 10. Incidentally, the groove 51e also has the role of improving the slidability of the rod 51 and reducing the amount of leakage.

In addition, a left axial end portion of the small diameter portion 51c is inserted into a recessed portion 70a that is recessed leftward in the axial direction from the center in the radial direct on of an adapter 70 provided at a right axial end of the pressure sensitive body 61, and is separably coupled to the adapter 70, and for example, when the suction pressure Ps is high, the pressure sensitive body 61 is contracted to cause the rod 51 to separate from the adapter 70. Furthermore, since a right axial end portion of the small diameter portion 51c inserted into the shaft hole 10c of the valve housing 10 is formed in a constricted shape, when the capacity control valve V is opened, the Pc-Ps flow passage (illustrated by solid arrows in FIG. 2) with a large flow passage cross-sectional area from the main valve chamber 20 of the valve housing 10 to the pressure sensitive chamber 60 can be secured.

As illustrated in FIGS. 1 to 3, the pressure sensitive body 61 mainly includes a bellows core 62 where a coil spring 63 is built in, and the adapter 70 which is provided at a right axial end of the bellows core 62, and a left axial end of the bellows core 62 is fixed to the partition adjustment member 11.

In addition, the pressure sensitive body 61 is disposed in the pressure sensitive chamber 60, and due to the biasing force of the coil spring 63 and the bellows core 62, a bottom surface of the recessed portion 70a of the adapter 70 is always in contact with a left axial end of the small diameter portion 51c of the rod 51. Namely, the leftward axial driving force of the solenoid 80 is applied to the pressure sensitive body 61 via the rod 51, and the rod 51 receives a rightward axial reaction force from the pressure sensitive body 61.

Next, an operation of the capacity control valve V will be described.

First, a de-energized state of the capacity control valve V will be described. As illustrated in FIGS. 1 and 2, when the capacity control valve V is in a de-energized state, since the movable core 63 receives rightward axial force induced by the biasing force of the coil spring 84 forming the solenoid 80 and the biasing force of the coil spring 63 and the bellows core 62, the right axial end of the movable core 63 comes into contact with the bottom surface of the cup 86, and the step portion 51a of the rod 51 separates from the valve seat 10a, which is formed in the inner peripheral surface of the valve housing 10, to open the main valve 50.

Next, an energized state of the capacity control valve V will be described. As illustrated in FIG. 3, when the capacity control valve V is in an energized state (i.e., during normal control, so-called duty control), since the movable core 83 is pulled toward a fixed core 82 side, namely, leftward in the axial direction by electromagnetic force generated by the application of a current to the solenoid 80, the rod 51 moves therewith leftward in the axial direction and the pressure sensitive body 61 is pressed leftward in the axial direction to be contracted, so that the step portion 51a of the rod 51 is seated on the valve seat 10a of the valve housing 10 to close the main valve 50.

As illustrated in FIG. 2, when the effective area of the bellows core 62 of the pressure sensitive body 61 to which the suction pressure Ps is applied is A, the effective area of the valve opening of the rod 51 to which the suction pressure Ps and the control pressure Pc are applied is B, the effective area of the sliding portion 51d of the rod 51 to which the suction pressure Ps and the control pressure Pc are applied is C, the electromagnetic force (i.e., the driving force) of the solenoid 80 is $F_{sol}$, the biasing force of the coil spring 84 forming the solenoid 80 is $F_{spr}$, and the biasing force of the pressure sensitive body 61 (i.e., the biasing force of the bellows core 62 and the coil spring 63) is $F_{bel}$, the balance of the forces applied to the rod 51 is expressed by the following equation with a rightward direction being positive, and when the effective area B of the valve opening of the rod 51 is set to be equal to the effective area C of the sliding portion 51d (i.e., B=C), the control pressures Pc applied to the rod 51 can be cancelled out.

$$(F_{spr}+F_{bel})-F_{sol}-(A-B+C)\cdot Ps-(B-C)\cdot Pc=0 \quad \text{(Equation)}$$

Accordingly, in the rod 51 of the present embodiment, since the suction pressure Ps is supplied to the accommodation chamber 30, in which the rear side of the rod 51 is accommodated, from the pressure sensitive chamber 60 via the communication hole 14, and the control pressures Pc applied to the rod 51 are cancelled out when the effective area B of the valve opening of the rod 51 set to be equal to the effective area C of the sliding portion 51d (B=C), the suction pressures Ps are applied to the rod 51 from both of the pressure sensitive chamber 60 and the accommodation chamber 30, so that the driving force of the solenoid 80 can be transmitted to operation of the rod 51 in a state where the influence of the pressures, particularly, the control pressure Pc is suppressed; and thereby, the rod 51 can be precisely controlled according to a current applied to the solenoid 80. Incidentally, the effective area A of the bellows core 62 of the pressure sensitive body 61 may be changed to change control characteristics of the rod 51.

In addition, since the rod 51 is in a state where the left axial end portion of the small diameter portion 51c is inserted into the recessed portion 70a of the adapter 70 and the bottom surface of the recessed portion 70a of the adapter 70 is always in contact with the left axial end of the small diameter portion 51c of the rod 51, force APs based on the biasing force $F_{bel}$ of the pressure sensitive body 61 and the suction pressure Ps applied to the pressure sensitive body 61 can be directly balanced with the electromagnetic force $F_{sol}$ of the solenoid 80, so that the rod 51 can be more precisely controlled.

In addition, since the communication hole 14 penetrates through the partition wall 10b of the valve housing 10 in the axial direction to allow the pressure sensitive chamber 60 and the accommodation chamber 30 to communicate with each other, and the suction pressures Ps applied to the rod 51 from both of the pressure sensitive chamber 60 and the accommodation chamber 30 are easily equalized, the rod 51 can be more precisely controlled. Furthermore, since the sealability of the sliding portion 51d of the rod 51 is improved by the labyrinth effect of the two grooves 51e having an annular shape and extending in the circumferential direction, the control pressure Pc is unlikely to be introduced to the accommodation chamber 30, and the suction pressures Ps in the pressure sensitive chamber 60 and the accommodation chamber 30 are more easily equalized.

In addition, since the communication hole 14 is provided in the valve housing 10, the communication hole 14 with a large flow passage cross-sectional area can be secured while the structural strength is maintained.

In addition, since the influence of pressure on the rod 51 is suppressed, for example, the biasing force of the coil spring 84 against the driving force of the solenoid 80 can be reduced, so that the electromagnetic force required in the solenoid 80 is reduced; and thereby, the size of the solenoid 80 can be reduced, and an energization current to the solenoid 80 can be reduced.

Second Embodiment

Figure 4:
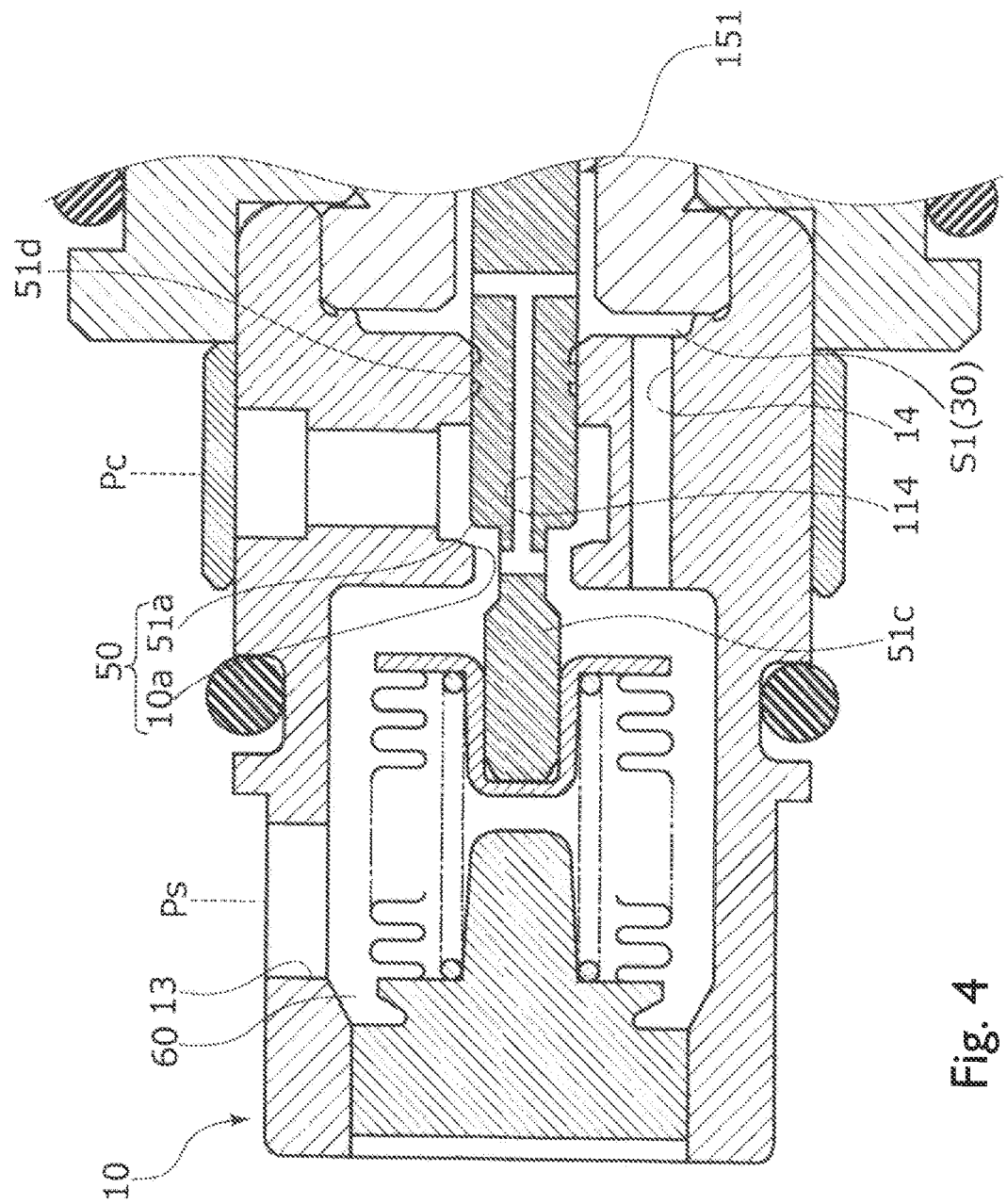
FIG. 4 is an enlarged cross-sectional view illustrating a state where a main valve is opened when a capacity control valve according to a second embodiment of the present invention is in a de-energized state.

Next, a capacity control valve according to a second embodiment will be described with reference to FIG. 4. Incidentally, the same components as the components illustrated in the above embodiment are denoted by the same reference signs, and duplicated descriptions will be omitted.

The capacity control valve V in the second embodiment will be described. As illustrated in FIG. 4, in the present embodiment, a rod 151 is provided with a communication hole 114 as a supply passage that extends from the right axial end portion of the small diameter portion 51c, the right axial end portion being formed in a constricted shape, to an axial position closer to the right side in the axial direction than the sliding portion 51d and is open to the space S1 forming the accommodation chamber 30, and the pressure sensitive chamber 60 communicates with the accommodation chamber 30 via the communication hole 114.

Accordingly, since the suction pressure Ps from the Ps port 13 can be supplied to the accommodation chamber 30 via two flow passages, namely, the communication hole 114 of the rod 151 and the communication hole 14 of the valve housing 10, the accommodation chamber 30 is easily held at the suction pressure Ps. In addition, when the capacity control valve V is opened, since the pressure sensitive chamber 60 and the accommodation chamber 30 can communicate with each other at an upstream position in the Pc-Ps flow passage (illustrated by solid arrows in FIG. 2) via the communication hole 114 of the rod 151, the suction pressures Ps of the pressure sensitive chamber 60 and the accommodation chamber 30 can be equalized in a shorter time.

Third Embodiment

Figure 5:
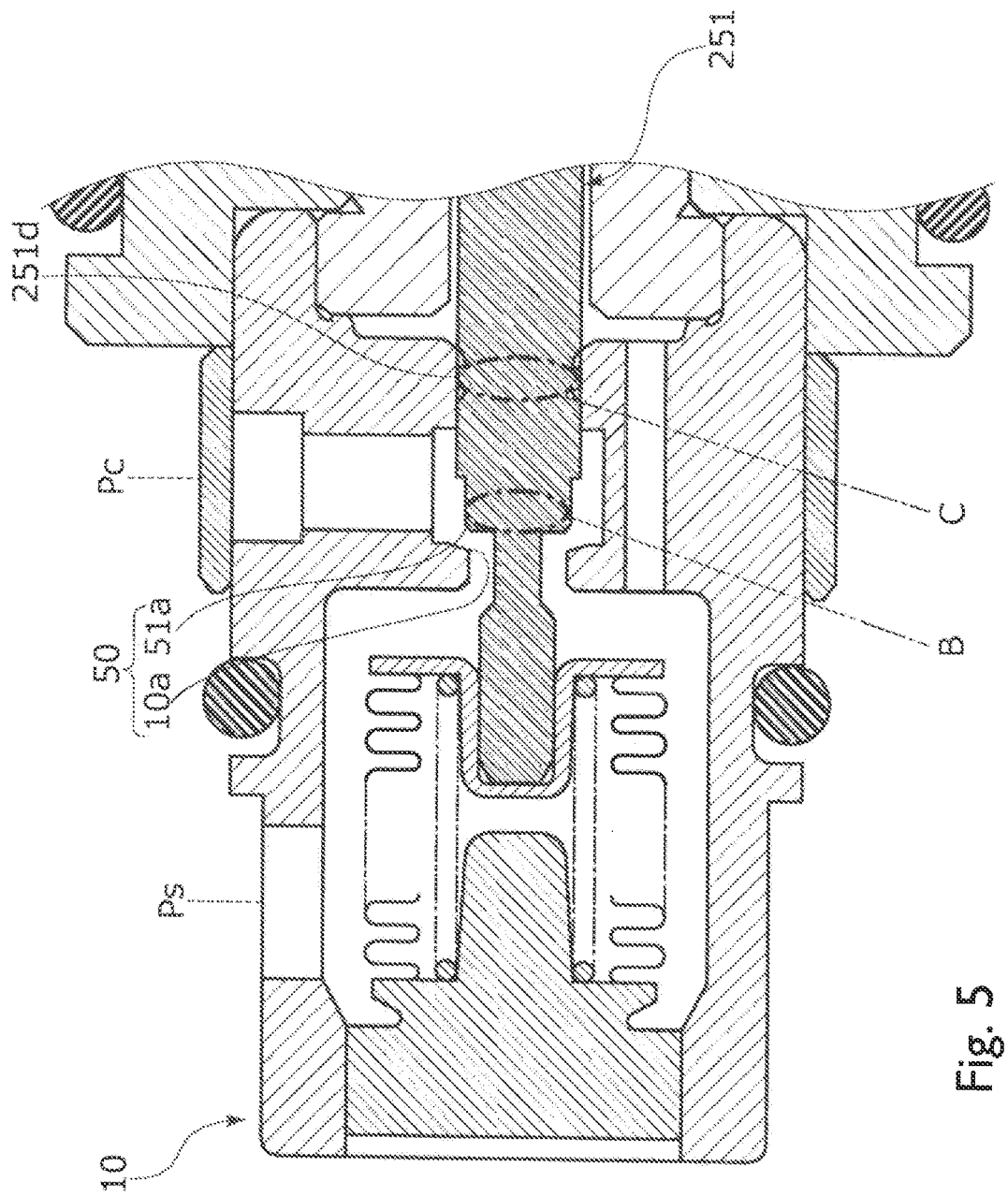
FIG. 5 is an enlarged cross-sectional view illustrating a state where a main valve is opened when a capacity control valve according to a third embodiment of the invention is in a de-energized state.

Next, a capacity control valve according to a third embodiment of the present invention will be described with reference to FIG. 5. Incidentally, the same components as the components illustrated in the above embodiment are denoted by the same reference signs, and duplicated descriptions will be omitted.

The capacity control valve V in the third embodiment will be described. As illustrated in FIG. 5, in the present embodiment, since the effective area C of a sliding portion 251d is set to be larger than the effective area B of the valve opening of a rod 251 (i.e., B<C), when the main valve 50 is closed, the control pressure Pc can be applied rightward in the axial direction, namely, in the valve opening direction, to adjust the driving force of the solenoid 80. In such a manner, the effective area B of the valve opening of the rod or the effective area C of the sliding portion can be appropriately changed to change control characteristics of the rod.

The embodiments of the invention have been described above with reference to the drawings; however, the specific configuration is not limited to the embodiments, and the invention also includes changes or additions that are made without departing from the scope of the invention.

For example, the embodiments have described a mode where the pressure sensitive chamber 60 and the accommodation chamber 30 communicate with each other via the communication hole 14 of the valve housing 10 or the communication hole 114 of the rod 151; however, the invention is not limited to the configuration, as long as the suction pressure Ps can be supplied to the accommodation chamber 30, for example, a Ps port through which the suction chamber of the variable displacement compressor and the accommodation chamber 30 communicate directly with each other may be provided.

In addition, the communication hole 14 provided in the valve housing 10 may be formed open to an inner peripheral surface of the shaft hole 10c. In addition, the communication hole may be formed only in the rod.

In addition, the above embodiments have described an example where the two grooves extending in the circumferential direction are formed in the sliding portion of the rod; however, the invention is not limited to the configuration, the grooves may be formed in the inner peripheral surface of the guide hole of the valve housing, or the grooves may be formed in both of the sliding portion of the rod and the inner peripheral surface of the guide hole of the valve housing. In addition, the number of the grooves may be 1 or 2 or more.

In addition, the small diameter portion of the rod may be coupled and fixed to the adapter 70 of the pressure sensitive body 61.

In addition, since in the rod of the above embodiments, a portion connected to the movable core 83 forming the solenoid 80, a valve body portion that comes into contact with and separates from the valve seat 10a, and a portion coupled to the pressure sensitive body 61 are integrally formed, the number of the components is reduced, so that the cost can be reduced; however, for example, when the portion connected to the movable core 83 is separately formed, the portion can be common with a component of the solenoid 80, and the valve body portion that comes into contact with and separates from the valve seat 10a or the portion coupled to the pressure sensitive body 61 can be easily changed in material or design.

In addition, instead that the coil spring is used inside the pressure sensitive body 61, the bellows core 62 may have biasing force according to the conditions of use.

REFERENCE SIGNS LIST

10 Valve housing
10a Valve seat
10b Partition wall
10c Shaft hole
10d Guide hole
11 Partition adjustment member
12 Pc port
13 Ps port
14 Communication hole (supply passage)
20 Main valve chamber
30 Accommodation chamber
50 Main valve
51 Rod (valve body)

51a Step portion
51b Large diameter portion
51c Small diameter portion
51d Sliding portion
51e Groove
60 Pressure sensitive chamber
61 Pressure sensitive body
62 Bellows core
63 Coil spring
70 Adapter
80 Solenoid
82 Fixed core
83 Movable core
84 Coil spring (spring)
85 Coil
86 Cup
114 Communication hole (supply passage)
151 Rod
B Effective area of valve opening
C Effective area of sliding portion
Pc Control pressure
Pd Discharge pressure
Ps Suction pressure
V Capacity control valve

The invention claimed is:

1. A capacity control valve comprising:
 a valve housing provided with a Ps port through which a suction fluid at a suction pressure passes and a Pc port through which a control fluid at a control pressure passes;
 a valve body that forms a main valve in cooperation with a valve seat, the valve body coming into contact with and separating from the valve seat to close and open a communication between the Pc port and the Ps port;
 a pressure sensitive body disposed in a pressure sensitive chamber formed inside the valve housing;
 a movable core provided in the valve housing and configured to move in an axial direction;
 a fixed core fixed to the valve housing; and
 a coil provided on an outer periphery of the fixed core,
 wherein the suction fluid is supplied from the Ps port to the pressure sensitive chamber, and
 an accommodation chamber in which a rear side portion of the valve body is accommodated is provided with a supply passage to which the suction fluid is supplied;
 the valve body is a rod fixed to the movable core,
 the movable core, together with the valve body, is driven by a solenoid due to energization of the coil to open and close the communication between the Pc port and the Ps port,
 the supply passage is a communication hole that is formed in the valve housing and that is configured to communicate with the pressure sensitive chamber and the accommodation chamber,
 a sliding portion between the valve body and the valve housing is positioned between the Pc port and the accommodation chamber,
 the sliding portion is provided with at least an annular groove, and
 all of the grooves are located within the sliding portion regardless of a position of the valve body with respect to the housing.

2. The capacity control valve according to claim 1, wherein the valve body is separably coupled to the pressure sensitive body.

3. The capacity control valve according to claim 2, further comprising
 a spring that biases the valve body against the driving force of the solenoid.

4. The capacity control valve according to claim 1, further comprising
 a spring that biases the valve body against the driving force of the solenoid.

* * * * *